V. BORST.
Harness Saddle.
No. 109,108.
Patented Nov. 8, 1870.
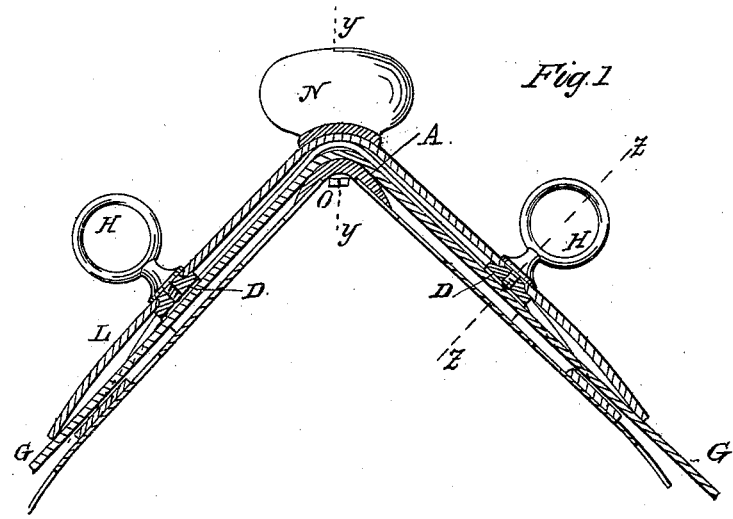
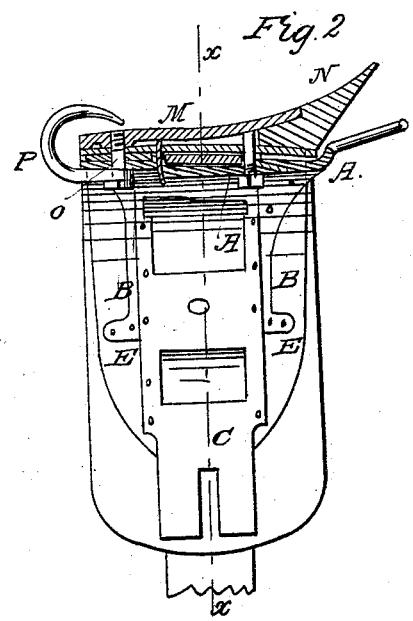
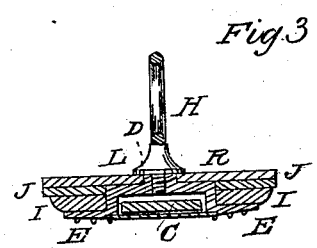
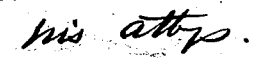

UNITED STATES PATENT OFFICE.

VALENTINE BORST, OF NEW YORK, N. Y.

IMPROVEMENT IN HARNESS-SADDLES.

Specification forming part of Letters Patent No. 109,108, dated November 8, 1870.

*To all whom it may concern:*

Be it known that I, VALENTINE BORST, of the city, county, and State of New York, have invented a new and useful Improvement in Harness-Saddles; and I do hereby declare the following to be a full, clear, and exact description thereof, which will enable those skilled in the art to make and use the same, reference being had to the accompanying drawings, forming part of this specification, in which drawings—

Figure 1 is a transverse section taken in the line *x x* of Fig. 2. Fig. 2 is a section from front to rear in the line *y y* of Fig. 1. Fig. 3 is a section in the line *z z* of Fig. 1, so as to show one of the terret-bars.

This invention consists in forming with the arms of the skeleton frame of the saddle-tree transverse terret-bars having their central portions elevated above the plane of the skeleton-frame; also, in constructing the cantle of wood and metal combined, so that the part thereof which is fastened to the saddle-tree is of metal, while the rear part is of wood.

The letter A designates a metallic skeleton frame formed with lateral arms B B, which extend downward on each side from the summit of the frame, and to which are secured the metallic elastic side plates, C, which serve to secure the loops for the back-band.

The letter D designates my new terret-bar, which is arranged transversely to the skeleton frame near the ends of its arms B B. In this example I have combined the terret-bar with the frame A by casting them together in one piece. The central parts of the turret-bars are raised, as seen at F, high enough to allow room for the back-bands G G to pass under the raised portions of the bars. The said raised portions F of the terret-bars are tapped to allow the shanks of the terrets H H to be screwed down into them, and by this construction I am enabled to secure the terrets in place without interfering with the back-bands, or with any part of the saddle. The depressed portions or ends E E of the bars are surmounted by the usual wooden mountings, I I, and by a leather filling-piece, J, which fits around the raised parts F of the terret-bars, and the tapped hole of said bar has a boss, K, around its upper edge, around which the leather cover L is fitted in such a manner that the flange of the terret comes down upon the boss and overlaps the cover.

Another part of my invention consists in a peculiar mode of constructing the cantle. The anterior part, M, of the cantle—the part which is secured to the rest of the saddle—is made of metal, while the posterior part, N, is of wood. By this construction I retain the desired strength in those portions of the cantle which receive the fastening devices, while the weight of the cantle is lessened; and, furthermore, by making the rear portion of wood, I obviate the liability of the covering of that part of the cantle to become rusty and discolored from contact with a metallic surface. The bolt O goes up through the head of the bridle-hook P, then successively through the skeleton frame, the wooden and leather mountings, and the cover, and then screws into the cantle. The head of the bolt is situated under the crotch of the skeleton frame, out of the way of any interference with other parts, and it is not liable to displacement, while its end is screwed into the cantle, and consequently the use of a nut to hold it to the saddle is rendered unnecessary.

What I claim as new, and desire to secure by Letters Patent, is—

1. The skeleton frame A, cast in one piece, with its bridge constructed as described, having the terret-bars formed upon the face of the frame, substantially as and for the purpose set forth.

2. In cantles, the combination of a metallic anterior part with a wooden posterior part, substantially as described.

VALENTINE BORST.

Witnesses:
W. HAUFF,
E. F. KASTENHUBER.